Patented Nov. 24, 1931

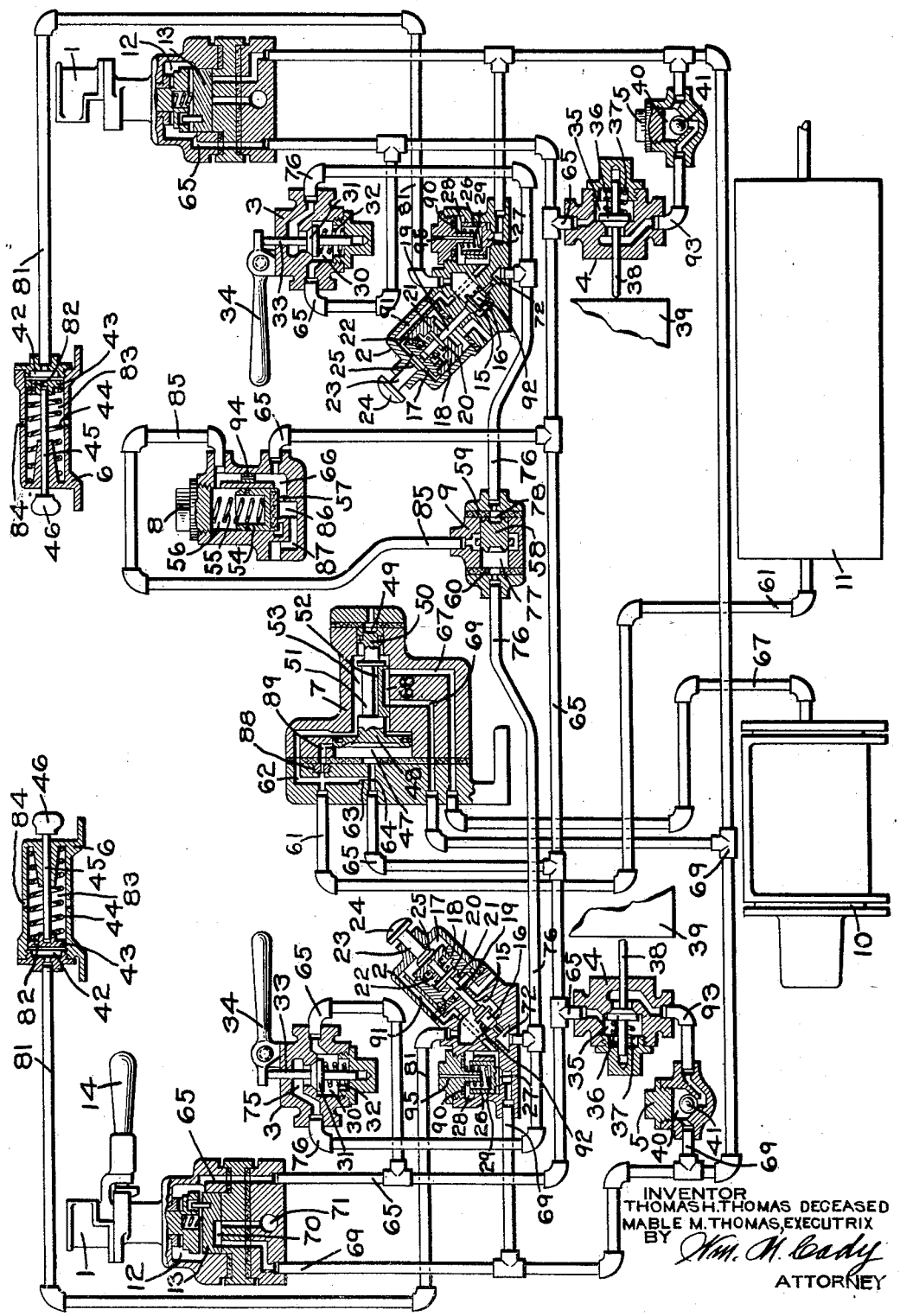

1,832,922

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA

SAFETY CAR EQUIPMENT

Application filed September 23, 1929. Serial No. 394,428.

This invention relates to fluid pressure brakes, and more particularly to safety car control equipment.

One object of the invention is to provide an improved and simplified safety car brake equipment.

Another object of the invention is to provide an improved safety car brake equipment having means for automatically applying the brakes in case the operator becomes incapacitated.

Another object of the invention is to provide improved means for ensuring that the brakes will be applied and not be released while any one of the car doors is open.

In the accompanying drawing, the single figure is a diagrammatic view, partly in section, of a safety car control equipment embodying the invention.

As shown in the drawing, the brake equipment is of the usual double end type and comprises at each end of the car a brake valve device 1, a combined foot valve and cut-off valve device 2, a change over valve device 3, a car door and brake interlock valve device 4, a check valve device 5, and a circuit breaker device 6. The equipment also comprises an emergency valve device 7, an application or vent valve device 8, a double check valve device 9, a brake cylinder 10 and a main reservoir 11.

The brake valve device 1 comprises a casing having a chamber 12 containing a rotary valve 13 adapted to be operated by a handle 14. As shown in the drawing, only one brake valve handle 14 is provided per car and is used on the brake valve device at the front or operative end of the car.

The combined foot valve and cut off valve device 2 comprises a casing having a chamber 15 containing a double beat valve 16, and a chamber 17 containing a piston 18 adapted to operate said valve. The valve 16 has a stem 19 slidably extending into a suitable bore in said piston. The stem 19 has a shoulder 20 adapted to engage a wall 21 in said piston and interposed between said shoulder and piston is a spring 22. Clearance is provided between the upper end of stem 19 and the bore in said piston, so as to provide a limited relative movement between the stem and piston, such relative movement being opposed by the spring 22.

Under certain conditions, to be explained hereinafter, the piston 18 is adapted to be manually operated by a plunger 23, which extends through the casing and engages said piston. On the outside of the casing the plunger 23 is provided with a button 24 adapted to be engaged by the operator's foot. The inner end of plunger 23 is enlarged having a valve 25 provided on the enlarged portion, which valve is adapted to engage a seat provided in the casing. Under other conditions, the piston 18 is adapted to be operated by fluid under pressure supplied to the chamber 17. For controlling the supply of fluid under pressure to said piston chamber and the venting of fluid under pressure therefrom, a cut-off valve piston 26 is provided. The valve piston 26 has a valve 27 at its lower end, and a spring 29, contained in chamber 28 at the upper side of said valve piston, tends to seat said valve.

The change over valve device 3 comprises a casing having a chamber 30 containing a valve 31 and a spring 32 tending to seat said valve. Said valve has a stem 33 extending through a suitable bore in the casing and adapted to be engaged by one end of a handle 34 for unseating said valve, the handle 34 being pivotally mounted on the valve casing.

The car door and brake interlock valve device 4 comprises a casing having a chamber 35 containing a valve 36 and a spring 37 adapted to seat said valve. The valve 36 is provided with a stem 38 slidably extending through a bore in the casing. The valve 36 is adapted to be unseated when a car door is opened and for illustrative purposes only a partial section of a car door 39 is shown, which car door is adapted to engage the valve stem 38 for unseating valve 36 when the door is opened, but when the door is in the closed position, as shown in the drawing, said door is out of engagement with stem 38 and permits spring 37 to seat valve 36.

The check valve device 5 comprises a casing having a chamber 40 containing a ball check valve 41 adapted to permit the flow of fluid under pressure only in one direction, the seating of such check valve preventing flow of fluid under pressure in the reverse direction.

The circuit breaker device 6 is adapted to operate a switch for opening the car motor circuit in the usual well known manner and comprises a casing having a chamber 42 containing a piston 43 and a spring 44 adapted to urge said piston to the position shown in the drawing. Said piston has a stem 45 extending through a bore in the casing and on the outer end of said stem is a button 46 adapted to engage a circuit breaker operating arm (not shown) for operating the circuit breaker.

The emergency valve device is of the usual construction comprising a casing having a chamber 47 containing a piston 48, and a chamber 49 containing a guide piston 50. Pistons 48 and 50 are connected together by a stem 51 and contained in a chamber 53 intermediate said pistons is a slide valve 52 adapted to be operated by said pistons.

The application valve device 8 comprises a casing containing a valve piston 54 and a spring 55 in a chamber 56 at the upper side of said valve piston for urging it into engagement with a seat rib 57.

The double check valve device 9 comprises a casing containing a double ended valve 58 adapted at one time to seat on a gasket 59 and at another time to seat on a gasket 60.

In operation, fluid under pressure is supplied to main reservoir 11 in the usual well known manner and flows thereupon through pipe 61 to the emergency valve device 7. Fluid under pressure thus supplied to the emergency valve device flows through passage 62 to valve chamber 53 and from passage 62 through a choke 63 in said passage and a passage 64 to piston chamber 47 and at the same time through passage 64 and an emergency brake pipe 65 to chamber 35 in the interlock valve devices 4, chamber 30 in the change over valve devices 3, rotary valve chamber 12 of the brake valve devices 1, and to a chamber 66 at the lower side of the application valve device 8 and from thence through a choked passage 94 to chamber 56 at the upper side of valve piston 54.

Only one brake valve handle 14 is provided per car and it is applied to the brake valve at the operative end of the car, after being removed from the brake valve at the opposite end of the car. Provision is made for the removal of the brake valve handle in a certain handle off or lap position. In the drawing the equipment as shown is operative at the left end, the brake valve being in release position, while the brake valve at the opposite end is in the inoperative, handle off or lap position. In both the release and lap position, the fluid under pressure supplied to chamber 12 maintains the rotary valve 13 seated.

The fluid pressure supplied to the emergency valve chamber 53 and the emergency piston chamber 47 being equal, the piston 48 is balanced. However, the pressure of fluid in valve chamber 53 acting on the small piston 50 shifts said piston, piston 48 and slide valve 52 to release position, against the atmospheric pressure acting on the right side of the small piston.

With the emergency slide valve 52 and the brake valve device 1 at the operative end of the car both in release position, the brake cylinder 10 is connected to the atmosphere through pipe and passage 67, cavity 68 in the emergency slide valve 52, straight air passage and pipe 69, cavity 70 in rotary valve 13 of the brake valve device and atmospheric passage 71.

In preparing to operate the car, the foot valve plunger 23 at the operative end of the car is depressed. This shifts the piston 18 downwardly, which shifts the double beat valve 16 to its lower seat, so as to close communication from chamber 72 connected to a safety control pipe 76, to chamber 15 connected with pipe 81, which is normally at or near atmospheric pressure as will be evident from the following description. Handle 34 of the change over valve device 3 at the operative end of the car is next operated to unseat valve 31, which permits fluid at main reservoir pressure to flow from chamber 30 to chamber 75 and from thence through the safety control pipe 76 to chamber 72 in the foot valve device 3, and to a chamber 77 at the left side of the double check valve 58. Chamber 78 at the right side of the double check valve 58 is connected to the atmosphere at the inoperative end of the car by way of safety control pipe 76, chamber 72 in the foot valve device, past double beat valve 16, which is seated in its upper position, through chamber 15, pipe 81, piston chamber 42 in the circuit breaker device 6, port 82 in piston 43, spring chamber 83 and ports 84 in the casing. The fluid pressure supplied to the left side of double check valve 58 is thus permitted to shift said check valve to the right, into engagement with gasket 59, in which position fluid under pressure is permitted to flow from the safety control pipe 76 through chamber 77 to pipe 85 and from thence to chamber 56 at the upper side of the valve piston 54 in the application or vent valve device 8. Fluid at main reservoir pressure is supplied to chamber 66 at the lower side of valve piston 54 through choked passage 94 as hereinbefore explained, and a chamber 86 at the lower side of said valve piston and inside of seat rib 57 is normally exposed to atmospheric pressure through passage 87, so that the pressure of fluid in chamber 56 and the pressure of spring 55 normally maintains valve piston 54 seated against seat rib 57.

If it is desired to effect a service application of the brakes, the brake valve handle 14 at the front end of the car is operated to turn rotary valve 13 to service position (not shown) in which a port in the rotary valve connects valve chamber 12 to the straight air pipe 69, thereby permitting fluid at main reservoir pressure to flow from chamber 12 through pipe 69, cavity 68 in the emergency slide valve and pipe 67 to the brake cylinder 10, thereby causing the brakes to be applied.

If it is desired to limit the degree of service application, then when the desired brake cylinder pressure is obtained, the brake valve rotary valve 13 is turned to lap position, in which the connection to the straight air pipe 69 is lapped by said rotary valve, so as to cut off further flow of fluid under pressure to the brake cylinder.

To release a service application of the brakes, the rotary valve 13 is turned to release position, as shown in the drawing. In release position communication is established between the brake cylinder 10 and atmosphere, in the manner hereinbefore described, through which fluid under pressure is vented from said brake cylinder, thereby releasing the brakes.

If it is desired to effect an emergency application of the brakes, the brake valve rotary valve 13 is turned to emergency position (not shown), in which position the emergency brake pipe 65 is connected to the atmospheric passage 71 thereby permitting fluid under pressure to be vented from the emergency piston chamber 47 at a rate exceeding the rate of supply to said chamber through choke 63 and through a choke 88 in passage 89. The pressure of fluid in valve chamber 53 acting on the emergency piston 48 then shifts said piston to the left to emergency position against the reduced pressure in chamber 47. In moving to emergency position, piston 48 shifts slide valve 52 to a position in which passage 67 from brake cylinder 10 is connected to valve chamber 53. Fluid at main reservoir pressure is thus permitted to flow therefrom to the brake cylinder 10 and apply the brakes in emergency.

After an emergency application of the brakes is effected, the brakes may be released in the same manner as in initially charging the equipment.

When a service application of the brakes is effected, fluid under pressure is permitted to flow from straight air pipe 69 to the underside of valve 27 of the cut-off valve piston 26, and when a predetermined pressure becomes effective on said valve, the valve piston 26 is shifted upwardly into engagement with a seal 90 carrying with it the valve 27. This permits fluid under pressure from the straight air pipe 69 to flow past valve 27 to passage 91 and from thence to chamber 17, wherein the pressure of fluid acts downwardly on piston 18 to hold valve 16 seated in the position shown in the drawing. With valve 16 thus seated, the foot pressure may be removed from the plunger button 24.

If the foot pressure is removed from the plunger button 24 at any time other than when the valve piston 18 is held in its downward position by the pressure of fluid in chamber 17, or after having effected an emergency application of the brakes, then the pressure of a spring 92, acting on valve 16, shifts said valve and the piston 18 to their upper position, thereby connecting chamber 72 to chamber 15, which permits fluid under pressure to flow from chamber 56 in the application valve device 8 to piston chamber 42 in the circuit breaker device 6, by way of pipe 85, chamber 77 in the double check valve device 9, safety control pipe 76, chambers 72 and 15 in the foot valve device 2 and pipe 81. Fluid under pressure thus supplied to the circuit breaker device shifts piston 43 outwardly causing the button 46 to engage and operate a circuit breaker (not shown). In the outward position of circuit breaker piston 43, the ports 84 in the wall of the circuit breaker device are uncovered through which the fluid under pressure from chamber 56 of the application valve device is vented to the atmosphere. The pressure of fluid in chamber 66 at the opposite side of valve piston 54 in the application valve device then shifts said piston to an upper position away from seat rib 57, in which position chamber 66 is connected to chamber 86 and fluid under pressure is suddenly vented from the emergency brake pipe 65, and the connected emergency piston chamber 47, to the atmosphere through chambers 66 and 86 and atmospheric passage 87. The venting of fluid under pressure from the emergency piston chamber 47 causes an emergency application of the brakes to be effected in the same manner as when effected by operation of the brake valve device 1, as hereinbefore described.

The car door and brake interlock valve device 4 is provided to ensure that the car door 39 is not open when the car is running.

When the brakes are released, if the car door 39 is opened, said door operates stem 38 and unseats valve 36, which permits fluid under pressure to flow from the emergency brake pipe 65 and the emergency piston chamber 47 through chamber 35 and past valve 36 to pipe 93 and from thence past ball check valve 41 to the straight air pipe 69, which is connected to the atmosphere through the brake valve device in release position. Fluid under pressure is thus vented from the emergency piston chamber 47 at a rate exceeding the rate of supply to said piston chamber and as a result, the emergency valve device is shifted to emergency position in which an emergency application of the brakes is effected in the same manner as hereinbefore described.

If the brakes are applied and a car door is open and the brake valve is moved to release position to release the brakes without first closing the car door, then fluid under pressure will be vented from the straight air pipe through the brake valve device. At the same time fluid under pressure will be vented from the emergency brake pipe through the valve device 4 and straight air pipe and cause the emergency valve device to move to emergency position and effect an emergency application of the brakes in the manner hereinbefore described.

In order to change the equipment, so as to operate the brakes from the opposite end of the vehicle, a service application, of sufficient degree to cause foot operated valve piston 18 at the front end of the car to seat double beat valve 16 in its downward position, is first effected. The foot pressure may then be removed from plunger button 24 and the brake valve device turned to lap position in which the brake valve handle 14 is removed from the brake valve device. The brake valve handle is then placed on the brake valve device at the opposite end of the car. Then the plunger button at this end of the car is depressed and the handle 34 of the change over valve device 3 is operated to unseat valve 31, which permits fluid under pressure to flow from emergency brake pipe 65, past valve 31 and through safety control pipe 76 to chamber 78 at the right side of double check valve 58. While the foot operated double beat valve 16 at the left end of the car is maintained seated in its lower position by fluid under pressure from the straight air pipe 69 acting on the valve piston 18, the pressure of fluid in pipe 76 and chamber 77 at the left side of double check valve 58 is still maintained by flow of fluid under pressure from chamber 66 in the application valve device 8 through the choked passage 94 to chamber 56 and from thence through pipe 85. The fluid pressures are thus balanced on the opposite sides of the double check valve 58 and said valve remains in the position shown in the drawing.

In order to shift the double check valve 58 to the left position, so as to establish communication from the application valve device 8 to foot valve device 2 at the right end of the car, the brake valve at the right end of the car is moved to release position, in which fluid under pressure is vented from the brake cylinder 10 by way of straight air pipe 69 in the same manner as in releasing the brakes when operating at the left end of the car as previously described. When the pressure in the straight air pipe is thus reduced to a predetermined degree, the pressure of spring 29 in foot valve 2 at the left end of the car shifts valve piston 26 to its lower position and connects piston chamber 17 to the atmosphere through passage 91, valve chamber 28 and a passage 95. Fluid under pressure being thus vented from piston chamber 17, spring 92 shifts double beat valve 16 and piston 18 upwardly, thereby connecting chambers 72 and 15 together, which permits fluid under pressure to be vented from safety control pipe 76 to the atmosphere through said chambers, pipe 81 and the circuit breaker device 6. In this manner, the fluid pressure is reduced in chamber 77 at the left side of double check valve 58 and the pressure of fluid in chamber 78 at the opposite side of said valve then shifts said valve to the left against gasket 60, in which position communication is established between the application valve device 8 and foot valve device 2 at the right end of the car.

In the manner just described the brake control is transferred from the left end of the car to the right end of the car. The brakes may now be operated from the right end of the car in the same manner as when operated from the left end of the car, as hereinbefore described.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a safety car control equipment, the combination with an emergency pipe and a straight air pipe, of a valve device operative upon a reduction in emergency pipe pressure for applying the brakes, a car door and means operated upon opening said car door for venting fluid under pressure from said emergency pipe to said straight air pipe.

2. In a safety car control equipment, the combination with an emergency pipe and a straight air pipe, of a valve device operative upon a reduction in emergency pipe pressure for applying the brakes, a car door and means operated by said car door when opened for venting fluid under pressure from said emergency pipe to said straight air pipe.

3. In a safety car control equipment, the combination with a brake cylinder, of a straight air pipe through which fluid under pressure is supplied to said brake cylinder to effect an application of the brakes, an emergency pipe, valve means operated upon a reduction in emergency pipe pressure for supplying fluid under pressure to said brake cylinder, a car door, and a valve device operative by said car door for effecting a communication through which fluid under pressure is vented from said emergency pipe to said straight air pipe.

4. In a safety car control equipment, the combination with a brake cylinder, of a straight air pipe through which fluid under pressure is supplied to said brake cylinder to effect an application of the brakes, an emergency pipe, valve means operated upon a reduction in emergency pipe pressure for supplying fluid under pressure to said brake cylinder, a car door, and a valve device operative by said car door for effecting a communication through which fluid under pressure is vented from said emergency pipe to said straight air pipe and means for preventing flow of fluid from said straight air pipe to said valve device.

5. In a safety car control equipment, the combination with an emergency pipe and a straight air pipe, of a valve device operative upon a reduction in emergency pipe pressure for applying the brakes, valve means operative upon opening a car door for venting fluid under pressure from said emergency pipe to said straight air pipe and means subject to straight air pipe pressure for closing communication through which fluid is vented from said emergency pipe.

6. In a safety control brake apparatus, the combination with an emergency pipe and a straight air pipe, of a valve device operative upon opening a car door for venting fluid from said emergency pipe to said straight air pipe and means subject to straight air pipe pressure for controlling communication from said emergency pipe to said straight air pipe.

7. In a fluid pressure brake, the combination with an emergency brake pipe, of a valve device for venting fluid under pressure from said emergency brake pipe to the atmosphere to effect an application of the brakes, means for opening the motor circuit, and a manually controlled valve device interposed between said vent valve device and said means, said manually controlled valve device being operative to establish a communication for venting fluid under pressure from said vent valve device to said means for causing the operation of each.

8. In a fluid pressure brake, the combination with an emergency brake pipe, of a valve device for venting fluid under pressure from said emergency brake pipe to effect an application of the brakes, means for opening the motor circuit, and a manually controlled valve device interposed between said vent valve device and said means, said manually controlled valve device being normally subject to pressure by an operator for closing communication from said vent valve device to said means, and operative upon the relief of said operator's pressure to permit fluid under pressure to flow from said vent valve device to said means to cause the operation of each.

9. In a fluid pressure brake, the combination with an emergency brake pipe, of a vent valve device operative to vent fluid under pressure from said emergency brake pipe, valve means for closing an exhaust passage from said vent valve device and manually operative means independent of said valve means for supplying fluid under pressure to said vent valve device for preventing the operation of said vent valve device when said valve means is subject to manual pressure.

10. In a double ended brake equipment for a vehicle, the combination with an emergency brake pipe, of a vent valve device for venting fluid under pressure from said emergency brake pipe to apply the brakes on said vehicle, a manually operated valve device at each end of said vehicle, valve means operated by fluid under pressure for controlling communication from said vent valve device to said manually operated valve devices and manually operated valve means adapted only to supply fluid under pressure to said valve means for closing communication from said vent valve device to one of said manually operated valve devices.

11. In a double ended brake equipment for a vehicle, the combination with an emergency brake pipe, of a vent valve device for venting fluid under pressure from said emergency brake pipe to apply the brakes on said vehicle, a foot operated valve device at each end of said vehicle, valve means operated by fluid under pressure for effecting a communication from said vent valve device to the foot-operated valve device at the operating end of the vehicle, and hand operated valve means at the operating end of the vehicle for supplying fluid under pressure to said valve means for closing communication from said vent valve device to the foot-operated valve device at the non-operating end of the vehicle, when the first mentioned valve device is subject to manual pressure by an operator.

12. In a safety car control equipment, the combination with a safety control pipe, of a foot controlled valve device for venting fluid under pressure from said pipe, means operated upon a reduction in fluid pressure in said safety control pipe for effecting an application of the brakes, and a normally closed valve for controlling a supply of fluid under pressure to said pipe and manually operated means for opening said valve.

13. In a safety car control equipment, the combination with a safety control pipe, of a foot controlled valve device for venting fluid under pressure from said pipe, means operated upon a reduction in fluid pressure in said safety control pipe for effecting an application of the brakes, and a valve device operative to control the supply of fluid under pressure to said pipe comprising a normally closed valve for controlling communication through which fluid under pressure is supplied to said pipe and a manually operated member for opening said valve.

14. In a safety car control equipment, the combination with an emergency brake pipe and means operated upon a reduction in fluid pressure in said pipe for effecting an emergency application of the brakes, of a straight air pipe, a car door, and a valve operated by the opening of said door for venting fluid under pressure from said emergency brake pipe to said straight air pipe.

15. In a safety car control equipment, the combination with an emergency brake pipe and means operated upon a reduction in fluid pressure in said pipe for effecting an emergency application of the brakes, of a straight air pipe, a car door, a valve operated by the opening of said door for venting fluid under pressure from said emergency brake pipe to said straight air pipe, and a check valve for preventing flow from the straight air pipe to the emergency pipe.

In testimony whereof I have hereunto set my hand.

MABLE M. THOMAS,
*Executrix of the Last Will and Testament of Thomas H. Thomas, Deceased.*